United States Patent Office.

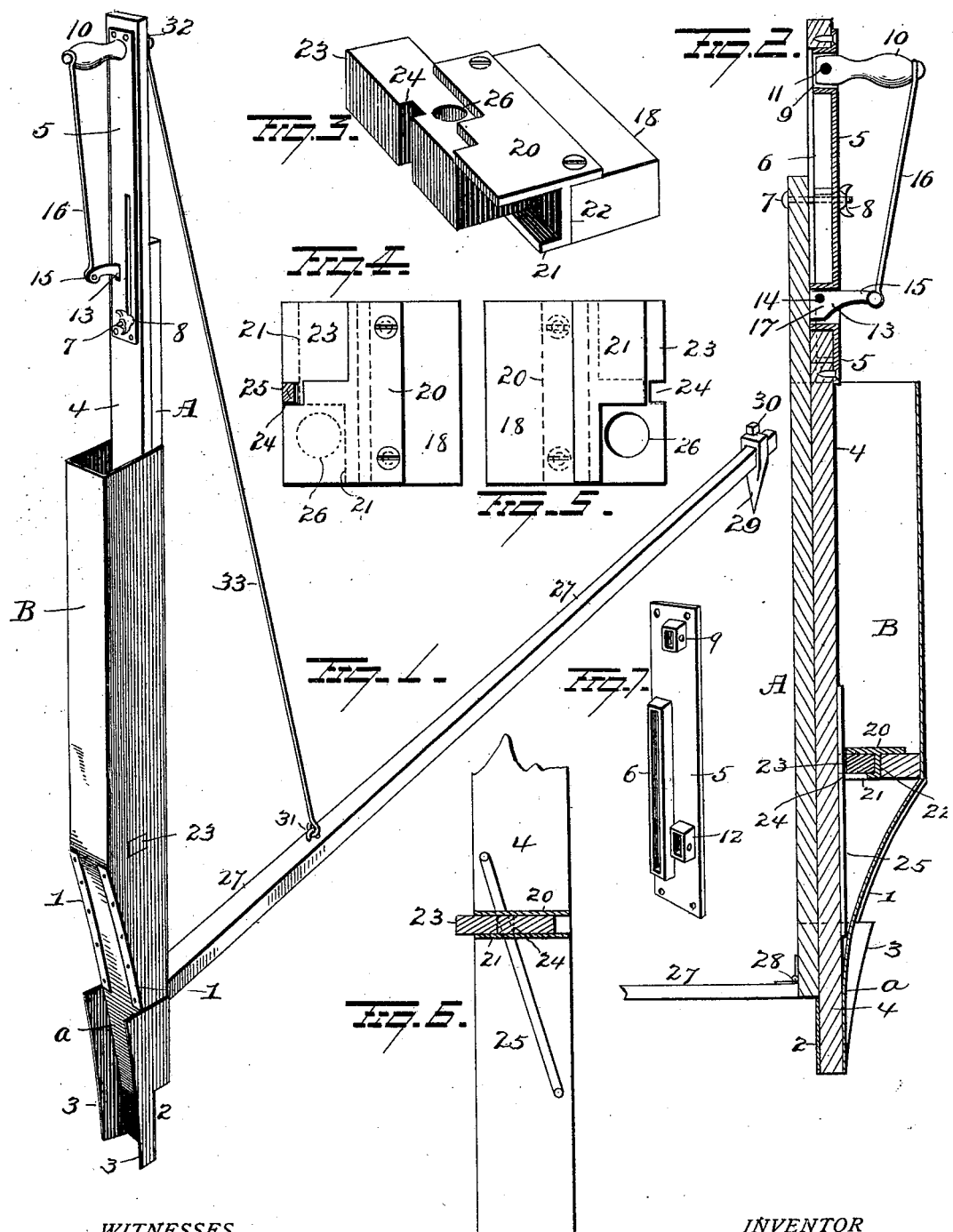

WILLIAM C. JOHNSON, OF QUINCY, ILLINOIS, ASSIGNOR OF TWO-THIRDS TO J. O. LITTLE AND H. W. MEAD, OF SAME PLACE.

HAND-PLANTER.

SPECIFICATION forming part of Letters Patent No. 646,554, dated April 3, 1900.

Application filed January 10, 1900. Serial No. 992. (No model.)

*To all whom it may concern:*

Be it known that I, WILLIAM C. JOHNSON, a resident of Quincy, in the county of Adams and State of Illinois, have invented certain new and useful Improvements in Hand-Planters; and I do hereby declare the following to be a full, clear, and exact description of the invention, such as will enable others skilled in the art to which it appertains to make and use the same.

My invention relates to an improvement in hand-planters, the objects of the invention being to provide a hand-planter whose feed will be regular and positive, which will be especially adapted for use in hard ground, and which will be extremely simple in construction, easily operated, and strong and durable when in use.

With these objects in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a view in longitudinal section of the same, and Figs. 3, 4, 5, 6, and 7 are detail views.

A represents an upright or standard, preferably of wood, to the side edges of which is secured a sheet-metal rectangular grain-receptacle B. The lower front portion of the sides of the grain-receptacle are beveled or inclined and are provided with inwardly-projecting flanges 1, secured to the front of the receptacle by suitable rivets, and the lower end of the front portion extends downward to form a spring-tongue *a*. A metallic blade 2 is secured to the lower end of upright A and is provided with parallel outwardly-projecting sides 3, between which the tongue A is disposed and normally held against the blade 2 by its own spring tension.

A plunger 4 is disposed against the front face of the upright A and is made appreciably longer than said upright. The upper portion of the plunger is provided with a large opening, and a plate 5 is secured to the front face of said plunger 4 over said opening and is provided with an elongated slot, and said plate 5 is provided with a rearwardly-projecting flange 6 around the slot therein, as shown.

A bolt 7 passes through a hole in the upright A and is mounted in the slot in the plunger and is held in place by a thumb-nut 8. Hence said bolt 7 will serve to limit the movement of the plunger.

An angular hole is provided in the upper portion of plate 5, and an inwardly-projecting flange 9 is provided around said opening, and a handhold 10 is pivotally supported in said flanged portion 9 by means of a pin 11. The plate 5 is also provided near its lower end with an angular opening, and a flange 12 is provided around said opening, in which is pivotally supported a bell-crank lever 13 by means of a pin 14 passing through said lever 13 and flange 12, respectively.

The outer end of the handle or handhold 10 is connected with the outwardly-projecting member 15 of the lever 13 by a rod 16, and hence it will be seen that when the operator forces the outer end of the handle 10 downward he will operate the lever 13 to force the member 17 into frictional engagement with the upright A and lock the plunger and upright together and force the blade 2 into the ground, when the operator can raise the outer end of the handle 10, release the lever 13 from engagement with the upright A, and by pressing the inner end of the handle 10 downward operate the plunger independent of the upright, for a purpose which will now be explained.

A transversely-disposed block 18 is secured in the grain-receptacle B, and an angular guide or track is secured to said block 18 and comprises a top plate 20, a bottom plate 21, and a vertical connecting-plate 22.

A sliding block 23 is mounted between the upper and lower plates 20 and 21 and has its edge disposed against the vertical plate 22 and is provided on its inner edge with a recess 24 for the reception of a diagonally-disposed rod 25, secured to the front face of the plunger 4, so that when said plunger is raised or lowered the rod 25 will move the block 23 from side to side. The block 23 is provided with a hole 26 for the passage of grain therethrough, and said hole is normally closed by the top plate 20; but said plate 20 is notched at one side to expose the hole 26 and permit the grain to fall therein. However, when the block 23 is in this position the lower plate will close the bottom of the hole, and when the block is moved back to its former position the notched portion of the under plate 21 will permit the grain in said hole to fall down between the blade 2 and tongue $a$ and be held in such position until the lower end of the plunger forces said tongue $a$ outward and permits the grain to fall.

The operation of my improved planter is as follows: The operator first operates the handle 10 to throw the lever 13 into engagement with the upright and lock the plunger and upright together. Hence a downward movement of the handle will force the plate 2 and tongue $a$ into the ground. The handle is now operated to release the lever from engagement with the upright and the plunger pushed downward, which operation will throw the block 23 to one side, expose the hole 26 therein, and permit the grain to fill said hole, the bottom plate 21 preventing the grain falling through said hole. The upward movement of the plunger will force the block 23 back to its former position, after which the bottom plate 21 will permit the grain to fall out of the hole 26, and the upper plate 20 will prevent the grain from entering the hole. The next downward movement of the plunger will force the tongue $a$ away from plate 2 and permit the grain to fall onto the ground. A rod 27 is hinged at one end to the lower end of upright A, as shown at 28, and is provided with an adjustable tooth or marker 29, held in place on the rod by a set-screw 30. The rod 27 is provided with an eye 31 a short distance from its hinged end, and the plunger is also provided near its upper end with an eye 32, and a rod 33 is connected at its respective ends in said eyes. It will thus be seen that when the plunger is raised the outer toothed end of rod 27 will be raised, and as the plunger makes its downward stroke the tooth or marker 29 will be driven into the ground and mark the proper place for the next hill.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a planter, the combination with an upright and a grain-receptacle secured to said upright, of a grain-dropper in said receptacle, a plunger adapted to operate said dropper, and means connected with said plunger for locking the plunger and upright together.

2. In a planter, the combination with an upright, a grain-receptacle secured thereto and dropping means in said receptacle, of a plunger movably connected to said upright and adapted to operate said dropping means, a handle or handhold pivotally connected at its inner end to said plunger, said plunger having a slot therein, a bell-crank lever mounted in said slot, a rod connecting one member of said lever with the outer end of the handle and the other member of said lever adapted to be forced into engagement with the upright when the outer end of the handle is forced downward.

3. In a planter, the combination with an upright, a grain-receptacle secured thereto and a plunger mounted in said receptacle and movably connected to said upright, of a block secured in said receptacle, a track secured to said block and having outwardly-projecting parallel plates having notches therein at opposite ends, a movable block mounted between said plates and having a recess in one side and a hole passing through said block for the passage of grain, and a diagonally-disposed rod secured to the plunger and mounted in the recess in the movable block to reciprocate the same when the plunger is operated.

4. In a planter, the combination with an upright, a grain-receptacle secured thereto, dropping means in said receptacle and an upwardly-projecting plunger adapted to operate said dropping means, of a horizontally-disposed rod hinged to the upright near the lower end thereof, an adjustable tooth or marker on said rod, and another rod connecting the first-mentioned rod with the plunger so as to raise and lower the rod and tooth or marker thereon when the plunger is operated.

5. In a planter, the combination with an upright, a grain-receptacle secured thereto and dropping means in said receptacle, of a plunger movably connected to said upright and adapted to operate said dropping means, a clutch adapted to lock the plunger and upright together and a handle or handhold adapted to operate said clutch.

6. In a planter, the combination with an upright, and a grain-receptacle secured thereto, of a stationary block in said receptacle, a track or guide secured to said stationary block, the track or guide having upper and lower plates with notches at opposite ends, a sliding block in said guide or track and between said plates, said sliding block having a grain-hole therein adapted to be alternately closed by the plates on the guide, said sliding block having a notch in one side, a plunger and a diagonally-disposed rod on said plunger disposed in the recess in the sliding block so that when the plunger is operated it will reciprocate the sliding block and drop the grain.

In testimony whereof I have signed this specification in the presence of two subscribing witnesses.

WILLIAM C. JOHNSON.

Witnesses:
LUCIEN COVER,
JOHN Q. BROWN.